(12) United States Patent
Rutschmann et al.

(10) Patent No.: US 6,250,272 B1
(45) Date of Patent: Jun. 26, 2001

(54) INTERNAL COMBUSTION ENGINE SUCTION SYSTEM UTILIZING RESONANCE

(75) Inventors: Erwin Rutschmann, Tiefenbronn; Claus Bruestle, Gerlingen, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/399,103

(22) Filed: Sep. 20, 1999

(30) Foreign Application Priority Data

Sep. 18, 1998 (DE) .............................. 198 42 724

(51) Int. Cl.[7] .................................................. F02M 35/14
(52) U.S. Cl. ........................................................ 123/184.57
(58) Field of Search ..................... 123/184.21, 184.53, 123/184.57, 184.26, 184.36, 184.44, 184.49

(56) References Cited

U.S. PATENT DOCUMENTS

| 4,622,926 | * | 11/1986 | Rutschmann et al. | 123/184.57 |
|---|---|---|---|---|
| 4,938,177 | * | 7/1990 | Hasegawa | 123/184.35 |
| 5,133,308 | * | 7/1992 | Hitomi et al. | 123/184.31 |
| 5,255,638 | * | 10/1993 | Sasaki et al. | 123/184.57 |
| 5,490,484 | * | 2/1996 | Rutschmann | 123/184.49 |
| 5,653,202 | * | 8/1997 | Ma | 123/184.43 |
| 5,704,326 | * | 1/1998 | Minegishi et al. | 123/184.53 |
| 5,765,372 | * | 6/1998 | Mitobe et al. | 60/301 |

FOREIGN PATENT DOCUMENTS

| 30 32 067 | 4/1982 | (DE) . |
|---|---|---|
| 34 24 433 | 1/1986 | (DE) . |
| 3633929 C2 | 4/1988 | (DE) . |
| 0056076 B1 | 7/1982 | (EP) . |
| 0 200 930 | 11/1986 | (EP) . |
| 0 265 960 | 5/1988 | (EP) . |
| 2 117 043 | 10/1983 | (GB) . |
| 359224417 | * 12/1984 | (JP) .............................. 123/184.21 |
| 36113824 | * 6/1986 | (JP) .............................. 123/184.21 |
| 62-191628 | 8/1987 | (JP) . |

OTHER PUBLICATIONS

Article, Porsche 911 Carrera—Gesamtfahrzeug, pp. 16, 18 & 19.

MTZ Motortechnische Zeitschrift 50, 1981, pp. 240–241.

* cited by examiner

*Primary Examiner*—Willis R. Wolfe
*Assistant Examiner*—Hai Huynh
(74) *Attorney, Agent, or Firm*—Evenson, McKeown, Edwards & Lenahan, P.L.L.C.

(57) ABSTRACT

A suction system has a device for utilizing resonance effects is provided on an internal-combustion engine with a lambda control and opposed cylinder banks. The suction system also has a resonance container which is connected to an air filter by a pipe connection provided with an air flow sensor. For optimization with respect to the components and the operation, the pipe connection has a first pipe section and a second pipe section which are separated from one another and in which one throttle valve respectively is arranged. An air flow sensor is provided only in one pipe section, and the control of the air flow in the other pipe section takes place by way of the lambda control.

20 Claims, 3 Drawing Sheets

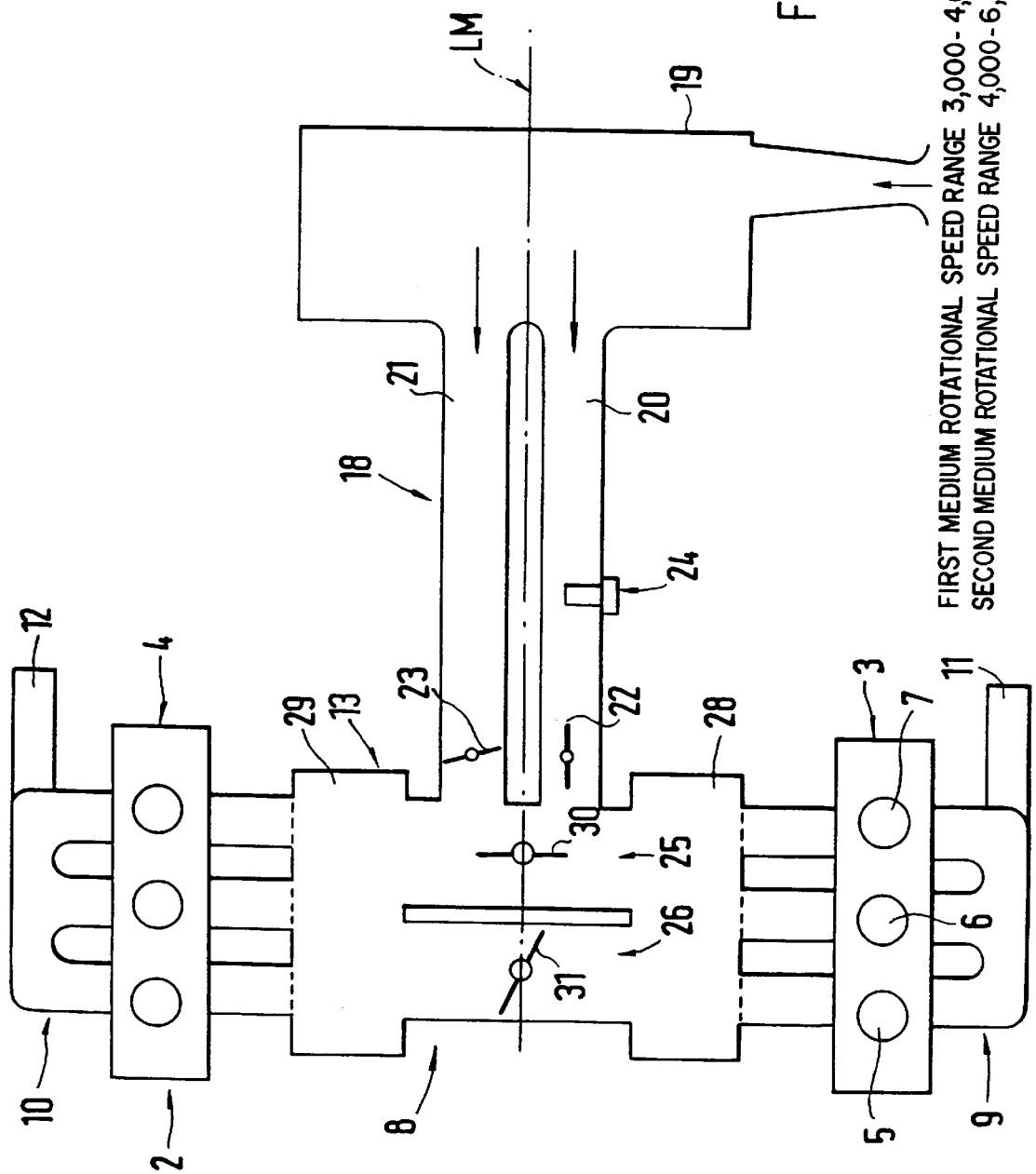

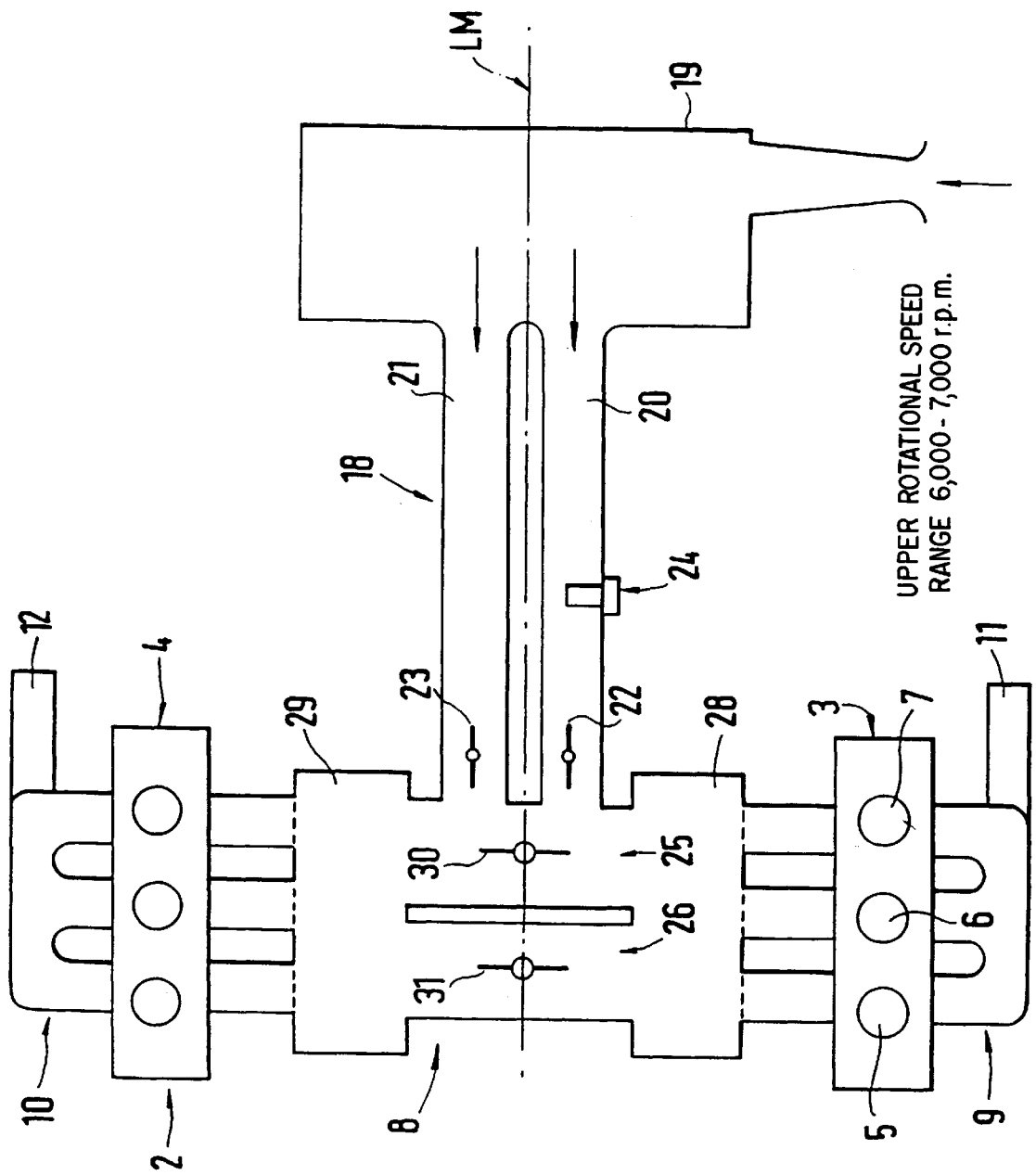

INTERNAL COMBUSTION ENGINE SUCTION SYSTEM UTILIZING RESONANCE

BACKGROUND OF THE INVENTION

This application claims the priority of 198 42 724.7, filed Sep. 18, 1998, the disclosure of which is expressly incorporated by reference herein.

The present invention relates to a suction system having a device for utilizing resonance effects for an internal-combustion engine equipped with a lambda control and opposed cylinders, and more particularly, to a suction system.

A known internal-combustion engine, German Special Edition *ATZ Automobiltechnische Zeitschrift; MTZ Motortechnische Zeitschrift*, pages 16 to 19, has opposed cylinder banks, a resonance-type suction system with an air flow sensor and a valve mechanism having a lambda control. DE 36 33929 C2 and EP 0 056 076 B1 relate to suction systems for internal-combustion engines by way of which resonance effects are achieved.

DE 198 14 970.0-13, which is not a prior publication, shows a pipe connection between an air filter and a suction system having a device for utilizing resonance effects. In sections, the pipe connection is provided with two parallel pipe sections, in front of which a single pipe section is connected. A throttle valve and an air flow sensor are integrated in the above-mentioned single pipe section.

SUMMARY OF THE INVENTION

An object of the present invention is to provide a suction system for an internal-combustion engine which, while the resonance effect is good, is optimized with respect to component expenditures along a significant internal-combustion engine rotational speed range.

Principal advantages achieved with the invention are that, as the result of the pipe sections with the throttle valves in the pipe connection and the transverse ducts having a shut-off flap and a resonance flap in the resonance container, targeted resonance effects are achieved. Along a wide rotational speed range of the internal-combustion engine, these effects lead to an optimized torque behavior of the internal-combustion engine. Only one air flow sensor is required in one pipe section, because the correction of the air flow in the other pipe section takes place by the existing lambda control. Finally, the pipe sections and the transverse ducts can easily be implemented in a suction system.

BRIEF DESCRIPTION OF THE DRAWINGS

Other objects, advantages and novel features of the present invention will become apparent from the following detailed description of the invention when considered in conjunction with the accompanying drawings.

FIG. 2 is a view similar to FIG. 1 but in a medium rotational speed range; and

FIG. 3 is another view similar to FIG. 1 but in a highter rotational speed range.

DETAILED DESCRIPTION OF THE DRAWINGS

Figure 1:
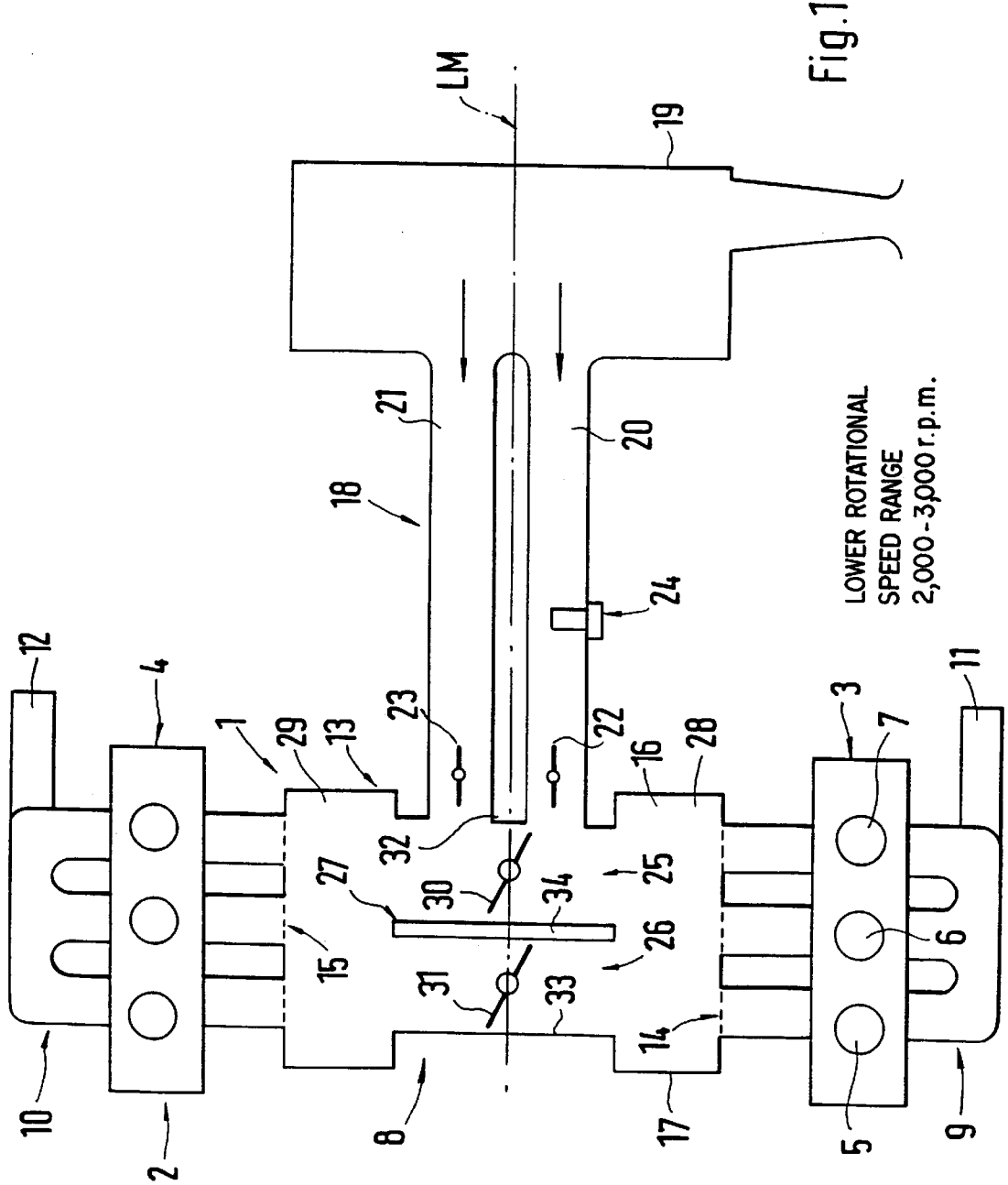
FIG. 1 is a schematic view of a suction system of an internal-combustion engine in a lower rotational speed range.

A suction system 1 is a component of an internal-combustion engine 2 which comprises opposite cylinder banks 3, 4. That is, the cylinder banks 3,4 are arranged in a horizontally opposed form or in a V-shape with respect to one another, specifically at a distance from a longitudinal center line LM of this engine. In the illustrated embodiment, for example, three cylinders 5, 6, 7 respectively are provided for each cylinder bank. Between the cylinder banks 3, 4, the suction system 1 is arranged which has a device 8 for utilizing resonance effects, as they are achieved by means of Helmholtz resonators, as described in Bosch, *Automotive Handbook,* 22nd Edition, 1995, Page 379. The cylinder banks 3, 4 are followed by exhaust systems 9, 10 which are provided with lambda probes 11, 12 for a known lambda control used for operating exhaust gas catalysts of the internal-combustion engine.

The device 8 of the suction system 1 has a resonance container 13 of a basic prism shape with longitudinal walls 14, 15 facing the cylinder banks 3, 4, and first and second frontal walls 16, 17 which extend at a right angle to these longitudinal walls 14, 15. From the direction of the first front wall 16, the resonance container 13 is connected via pipe connection 18 to an air filter 19. The pipe connection 18 has a first pipe section 20 and a second pipe section 21 which are separated from but extend parallel to one another between the resonance container 13 and the air filter 19. Throttle valves 22, 23 are arranged in the two pipe sections 20, 21. Furthermore, the first pipe section 20 is provided with an air flow sensor 24. No air flow sensor is housed in the second pipe section 21. The corrected metering or controlling of the air flow in the second pipe section 21 takes place via the lambda control.

The resonance container 13 is provided with transverse ducts 25, 26 which extend between the cylinder banks 3, 4 and between which a partition 27 is arranged. The transverse ducts 25, 26 extend between a first resonance volume 28 and a second resonance volume 29 which are disposed in front of the cylinder banks 3, 4. In the transverse duct 25 adjacent to the air filter 19, a shut-off flap 30 is provided, whereas the transverse duct 26 is provided with a resonance flap 31.

FIG. 1 illustrates that the pipe sections 20, 21 extend approximately at a right angle with respect to the frontal wall 16. An area 32 is provided between the pipe sections 20, 21 which includes the longitudinal center line LM. On this longitudinal center line LM, the shut-off flap 30 and the resonance flap 31 are arranged and interact with transverse duct areas 33, 34.

According to FIG. 1, both throttle valves 22, 23 are opened, and the shut-off flap 30 and the resonance flap 31 are closed. These flap positions are suitable for the operation of the internal-combustion engine in the lower rotational speed range, preferably between 2,000 and 3,500 r.p.m.

In FIG. 2, the throttle valve 22 is opened and the throttle valve 23 is closed. Likewise, the shut-off flap 30 is opened and the resonance flap 31 is closed. At these flap positions, the internal-combustion engine can advantageously be operated in a first medium rotational speed range, for example, between 3,500 and 4,000 r.p.m. If, as indicated above, in the same positions of the shut-off flap 30 and the resonance flap 31, both throttle valves 22, 23 are opened, a favorable performance of the internal-combustion engine is achieved in a second medium rotational speed range, for example, between 5,000 and 6,000 r.p.m.

Finally, FIG. 3 illustrates that all flaps, i.e. throttle valves 22, 23 and shut-off flap 30 and resonance flap 31, are opened up. These positions ensure operating conditions of the internal-combustion engine 2 which must be stressed in an upper rotational speed range, i.e. between 6,000 and 7,000 r.p.m.

The foregoing disclosure has been set forth merely to illustrate the invention and is not intended to be limiting. Since modifications of the disclosed embodiments incorporating the spirit and substance of the invention may occur to persons skilled in the art, the invention should be construed to include, everything within the scope of the appended claims and equivalents thereof.

What is claimed is:

1. A suction system having a device for utilizing resonance effects for an internal-combustion engine having lambda control and opposed cylinder banks, comprising an air filter, a resonance container operatively connected to the air filter by the pipe connection wherein the pipe connection comprises a first pipe section and a second pipe section which are separated from one another and in each of which a throttle valve is operatively arranged, the air flow sensor being provided in only one of the pipe sections and the lambda control arranged to control air flow in the other of the pipe sections.

2. The suction system according to claim 1, wherein transverse ducts extend in the resonance container between the cylinder banks, and are provided with a shut-off flap and a resonance flap.

3. The suction system according to claim 2, wherein the transverse ducts extend between a first resonance volume and a second resonance volume arranged in front of the cylinder banks.

4. The suction system according to claims 2, wherein the shut-off flap and the resonance flap are operatively arranged in a range situated between the pipe sections.

5. The suction system according to claim 4, wherein the transverse ducts extend between a first resonance volume and a second resonance volume arranged in front of the cylinder banks.

6. The suction system according to claim 2, wherein in a rotational speed range of the internal-combustion engine both throttle valves are opened and the shut-off flap and the resonance flap are closed between about 2,000 and 3,500 rpm.

7. The suction system according to claim 6, wherein the transverse ducts extend between a first resonance volume and a second resonance volume arranged in front of the cylinder banks.

8. The suction system according to claim 7, wherein the shut-off flap and the resonance flap are operatively arranged in a range situated between the pipe sections.

9. The suction system according to claim 2, wherein one of the throttle valves is closed and another of the throttle valves is opened, and the shut-off flap is opened and the resonance flap is closed in a first medium rotational speed range of the internal-combustion engine.

10. The suction system according to claim 9, wherein the transverse ducts extend between a first resonance volume and a second resonance volume arranged in front of the cylinder banks.

11. The suction system according to claim 10, wherein the shut-off flap and the resonance flap are operatively arranged in a range situated between the pipe sections.

12. The suction system according to claim 11, wherein in a rotational speed range of the internal-combustion engine both throttle valves are opened and the shut-off flap and the resonance flap are closed between about 2,000 and 3,500 rpm.

13. The suction system according to claim 2, wherein the throttle valves are opened, and the shut-off flap is opened and the resonance flap is closed in a second medium rotational speed range of the internal-combustion engine between about 4,000 and 6,000 rpm.

14. The suction system according to claim 13, wherein the transverse ducts extend between a first resonance volume and a second resonance volume arranged in front of the cylinder banks.

15. The suction system according to claim 14, wherein the shut-off flap and the resonance flap are operatively arranged in a range situated between the pipe sections.

16. The suction system according to claim 15, wherein in a rotational speed range of the internal-combustion engine both throttle valves are opened and the shut-off flap and the resonance flap are closed between about 2,000 and 3,500 rpm.

17. The suction system according to claim 16, wherein one of the throttle valves is closed and another of the throttle valves is opened, and the shut-off flap is opened and the resonance flap is closed in a first medium rotational speed range of the internal-combustion engine.

18. The suction system according to claim 2, wherein, the throttle valves as well as the shut-off flap and the resonance flap are opened in an upper rotational speed range of the internal-combustion engine between about 6,000 and 7,000 rpm.

19. The suction system according to claim 18, wherein the transverse ducts extend between a first resonance volume and a second resonance volume arranged in front of the cylinder banks.

20. The suction system according to claim 19, wherein the shut-off flap and the resonance flap are operatively arranged in a range situated between the pipe sections.

* * * * *